Sept. 10, 1940.  E. PETERSON  2,214,625
TESTING MAGNETIC CORES AND COILS
Filed April 21, 1939
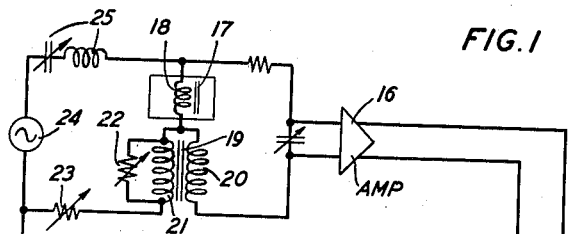
FIG. 1
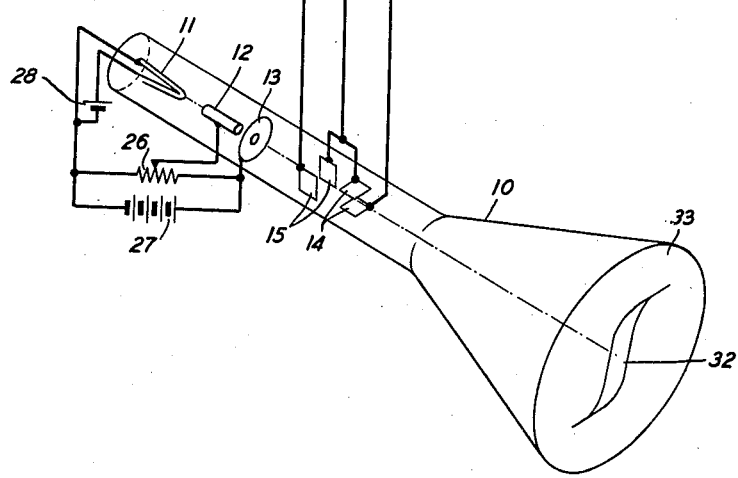
FIG. 2
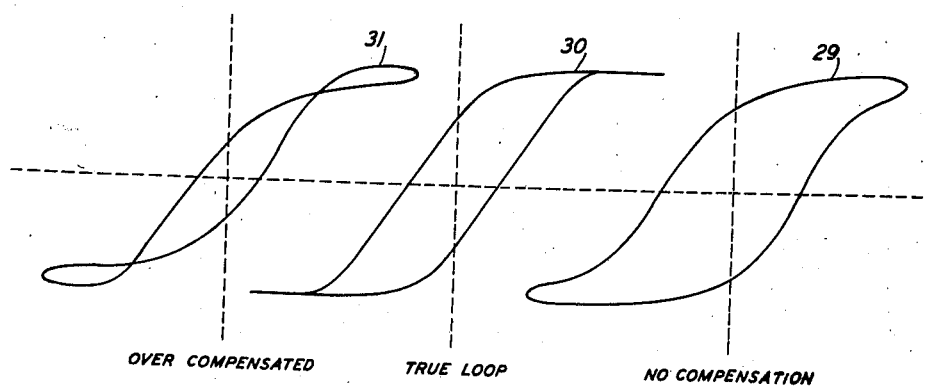
OVER COMPENSATED   TRUE LOOP   NO COMPENSATION
INVENTOR
E. PETERSON
BY W. F. Simpson
ATTORNEY Patented Sept. 10, 1940

2,214,625

UNITED STATES PATENT OFFICE 2,214,625

TESTING MAGNETIC CORES AND COILS

Eugene Peterson, New York, N. Y., assignor to Bell Telephone Laboratories, Incorporated, New York, N. Y., a corporation of New York Application April 21, 1939, Serial No. 269,084

3 Claims. (Cl. 175—183)

This invention relates to testing and measuring the properties of magnetic materials and the characteristics of coils wound upon cores of magnetic materials.

In accordance with this invention, the magnetizing current of a coil to be tested or wound upon the magnetic material to be tested is employed to deflect the cathode ray of a cathode ray oscillograph in a horizontal direction while the voltage appearing across the coil is employed to deflect the cathode ray in a vertical direction. Thus, the spot will trace a figure on the screen of a cathode ray oscillograph resembling the hysteresis loop of the material.

In all of the arrangements of the prior art which employ a cathode ray oscillograph to trace the hysteresis loop of magnetic material, two windings are required to be wound upon the magnetic material, one winding being employed to magnetize the material and the other winding to measure the flux or change of flux through the material. Thus, certain coils provided with only one winding, such as certain saturable coils employed in harmonic producers, cannot be readily tested by any of the arrangements disclosed in the prior art, such as in U. S. Patents 1,574,350, Johnson, February 23, 1926; 2,010,189, Hallowell, Jr., August 6, 1935; and 2,035,248, Scott, March 24, 1936.

It is, accordingly, an object of this invention to provide an arrangement for obtaining a hysteresis loop of magnetic material provided with only one winding.

When it was attempted to obtain a hysteresis loop by controlling the horizontal deflection of the cathode ray by the current flowing through the coil and in the vertical direction by the voltage between the terminals of the coil, it was discovered that the figure obtained did not represent a true hysteresis loop of the coil or of the magnetic material. It was discovered that an additional voltage component due to the resistance drop across the coil occasioned by the magnetizing current flowing through the resistance of the winding was included in the voltage causing the vertical deflection of the cathode ray. Where the magnetizing current is large, as, for example, in the case where the magnetic material is saturated as in harmonic producers, this additional voltage becomes sufficiently large to cause the figure traced upon the screen of the cathode ray oscillograph to materially depart from the true hysteresis loop of magnetic material.

Another object of this invention is to provide an arrangement for neutralizing, balancing or canceling the effects of this additional voltage in deflecting the spot vertically so that a true hysteresis loop of the material of the core of the single wound coil may be obtained.

Another object of this invention is to provide an arrangement whereby the iron loss and the copper loss of a single wound coil may be readily determined and measured.

The testing system in accordance with this invention has been discovered to be particularly well suited for the rapid testing of single wound coils having cores of magnetic materials. If any of the turns of the coil are short-circuited or there are any other substantial irregularities in the winding of the coil, they will materially affect the shape of the hysteresis loop, thus permitting these irregularities to be readily detected.

It is, therefore, another object of this invention to provide an arrangement for rapidly measuring the characteristics of single wound coils.

The foregoing objects and other objects and features of this invention, the novel features of which are set forth in the claims appended hereto, may be more fully understood from the following description when read with reference to the attached drawing in which:

Fig. 1 shows a circuit arrangement employed for testing and measuring magnetic properties, magnetic materials and the characteristics of coils wound upon cores of such materials; and Fig. 2 shows a series of hysteresis loops showing the effects of changing the adjustment of the circuit to provide different degrees of compensation.

Briefly the magnetic material to be tested is provided with a single winding. An alternating current is caused to flow through this winding and the magnitude of this current caused to control the horizontal deflection of a cathode oscillograph tube. The potential difference between the terminals of the coil due to the alternating current flowing through the coil is applied to the cathode ray oscillograph tube so as to deflect the cathode ray in a vertical direction. Thus the spot on the screen of the tube will trace the hyseresis loop of the magnetic material comprising the core of the single wound coil. In order to compensate or counteract the voltage drop appearing across the coil due to the alternating current flowing through the resistance of the winding of the coil an auxiliary transformer is employed having a resistance connected across its primary winding and the parallel combination of the resistance and primary winding of the transformer connected in series with said single wound coil so that the magnetizing current of the coil flows through this combination. The secondary winding of the auxiliary transformer is connected in series with the voltage employed to control the vertical deflection of the cathode ray beam. This additional voltage is adjusted to have substantially the same magnitude but opposite phase to the resistance drop due to the magnetizing current flowing through the resistance of the single winding wound upon the magnetic material or coil under test.

Referring now to Fig. 1, 10 represents a cathode ray oscillograph tube provided with an electron emitting cathode 11, which may be heated from any suitable source of power such as battery 28, and beam forming, focussing and accelerating electrodes 12 and 13. These electrodes are maintained at suitable potentials from any suitable source of power such as battery 27 and potentiometer 26.

The tube 10 as well as the elements 11, 12 and 13 and the associated sources of potential shown in the drawing are merely intended to represent a conventional cathode ray oscillograph tube with an "electron gun" suitable for producing a beam or ray of electrons. Any cathode ray tube having some means for forming a beam of electrons and directing said beam to a target or screen of more or less elements than shown in the drawing, and the associated circuits will be equally satisfactory to form part of the present invention as may be well understood by those skilled in the art.

The magnetic material or core 17 under test is provided with a single winding 18. The winding 18 is connected to a source of alternating current 24 through current regulating resistance 23 and the resonant network 25. Resonant network 25 is employed to permit sufficient current of the frequency of source 24 to flow through winding 18 and at the same time prevents source 24 from short-circuiting or shunting coil 18 at other frequencies. The voltage drop across the current regulating resistance 23 is applied to the horizontal deflecting plates 15 and cathode ray oscillograph tube 10 and causes the electron beam and the spot at which it strikes screen 33 to be deflected in a horizontal direction in accordance with the instantaneous value of the current flowing through resistance 23. The voltage appearing across the winding or coil 18 is applied to the vertical deflecting plates 14 of the cathode ray oscillograph tube 10 through amplifier 16. It is to be understood that a similar amplifier may be connected between the resistance 23 and the horizontal deflecting plates 15 when it is required. It is to be also understood that amplifier 16 may be dispensed with when the voltage across the coil 18 is of sufficient magnitude to give a satisfactory deflection without amplification.

Curve 29 of Fig. 2 shows a typical hysteresis loop of a single wound coil when the auxiliary transformer 19 is short-circuited. This loop is broader than the actual hysteresis loop of the magnetic material of core 17. The additional width of the loop is primarily due to the fact that its area represents both the copper loss caused by the magnetizing current flowing through the resistance of winding 18 and the core loss due to the hysteresis and eddy current losses in the magnetic material 17.

In order to obtain a true hysteresis loop with the magnetic material 17 an auxiliary transformer 19 having a primary winding 21 and a secondary winding 20 is connected as shown in Fig. 1. A variable resistance 22 is connected in parallel with the primary winding 21 of transformer 19 and this parallel combination is connected in series with coil 18 and the source of alternating current 24. Thus the magnetizing current for coil 18 flows through this parallel combination of resistance 22 and primary winding transformer 21. Transformer 19 operates at a very low flux density and its primary impedance is very much higher than the impedance of resistance 22 across which it is connected. Thus the voltage drop across the parallel combination of resistance 22 in the primary winding 21 of transformer 19 will be substantially in phase with the magnetizing current flowing through coil 18 and substantially in phase with the resistance drop across the winding 18 due to magnetizing current flowing through the resistance of this coil.

The secondary winding 20 of transformer 19 is connected in series with the voltage developed across the coil 18 and the combined voltage is applied to the vertical deflecting plates 14 through amplifier 16. Since the voltage across the primary winding 22 of transformer 19 is substantially in phase with the resistance drop across coil 18 the voltage appearing across the secondary winding 20 of transformer 19 will also be substantially in phase or in phase opposition, i. e., 180 degrees out of phase with the resistance drop appearing across winding 18. The winding 20 is so connected with respect to coil 18 that the voltage appearing across winding 20 is in substantial phase opposition to the resistance drop due to the magnetizing current flowing through the resistance of winding 18. By suitably adjusting the value or magnitude of resistance 22 the voltage across the secondary winding 20 of transformer 19 may be made equal in magnitude to the resistance voltage drop across the single winding 18 on core 17 and thus substantially neutralizing or balance out this voltage due to the magnetizing current flowing through the resistance of coil 18.

Curve 30 of Fig. 2 shows a typical hysteresis loop when the magnitude of resistance 22 is properly adjusted and more closely represents the true hysteresis loop of the magnetic material of core 17.

If resistance 22 is increased so that the magnitude of the voltage across winding 20 exceeds the voltage drop across coil 18 due to the magnetizing current flowing through the resistance of its winding, an over-compensated hysteresis loop such as shown by curve 31 of Fig. 2 is obtained clearly indicating that resistance 22 is too high.

This arrangement lends itself particularly well to separating the copper loss from the core loss of any coil or transformer because the product of the square of the magnetizing current and the value of resistance 22 when it is properly adjusted, as described above so that substantially a true hysteresis loop is traced upon the screen 33 of the cathode ray oscillograph tube 10, represents the copper loss of coil 18 under the operating conditions under which it is tested. The area of the true hysteresis loop may be employed to calculate the iron or core loss of the coil and the total losses may be measured and checked against the sum of the copper and iron loss as obtained above.

This arrangement also lends itself particularly well to testing single wound coils employed in harmonic producers and other circuits in which the coil is operated at high flux densities or in which the saturating properties of the magnetic material are made use of. Any irregularities in the winding 18 such as short-circuited turns, high distributed capacity, etc., materially affect the size and shape of the hysteresis loop. Consequently, it is only necessary to connect the two terminals of the coil winding to the circuit and observe the size and shape of the hysteresis loop to evaluate the properties of the coil and determine whether or not it is suitable for certain uses or for use in certain circuits.

It is to be understood that this invention is not limited to the specific embodiment set forth in the drawing and described above but includes any modifications which will readily occur to those skilled in the art.

What is claimed is:

1. A testing arrangement comprising a cathode ray oscillograph tube including a screen and means for producing and directing a beam of electrons toward said screen, a coil to be tested comprising a core and a single winding wound thereupon, means for causing current to flow through the winding of said coil, means for deflecting said beam of electrons parallel to an axis of said screen which deflections are proportional to the instantaneous current flowing through the winding of said coil and means for deflecting said beam of electrons parallel to an axis of said screen at right angles to said first axis which deflections are proportional to the potential difference between the terminals of the winding of said coil and means for applying an additional potential difference to said last-mentioned means in series with the potential difference between the terminals of the winding of said coil which additional potential difference is substantially equal to but opposite in phase to that portion of said first-mentioned potential difference which is due to said current flowing through the resistance of said single winding of said coil.

2. A testing arrangement comprising a cathode ray oscillograph tube including a screen, and means for producing and directing a beam of electrons toward said screen, a coil to be tested comprising a single winding, means for causing current to flow through said winding, means for deflecting said beam of electrons parallel to a line on said screen which deflections are proportional to the instantaneous current flowing through said single winding, and means for deflecting said beam parallel to another line on said screen at an angle to said first line which deflections are proportional to the instantaneous potential difference between the terminals of said winding and means for applying an additional potential difference to said last-mentioned deflection means which additional potential difference is substantially equal to but in phase opposition to that portion of the first-mentioned potential difference which is due to said current flowing through the resistance of said winding.

3. A testing arrangement for testing a coil having a single winding comprising means for causing a current to flow through said winding and means responsive to the instantaneous current flowing through said winding, other means responsive to the instantaneous potential difference across said winding and means for applying an additional potential difference to said last-mentioned responsive means which additional potential difference is substantially equal to but opposite in phase to the portion of the first-mentioned potential difference which is in phase with the current flowing through said winding.

EUGENE PETERSON.